US010757217B2

(12) United States Patent
Saha et al.

(10) Patent No.: US 10,757,217 B2
(45) Date of Patent: Aug. 25, 2020

(54) DETERMINING VIEWER AFFINITY FOR ARTICLES IN A HETEROGENEOUS CONTENT FEED

(71) Applicant: Microsoft Technology Licensing, LLC, Redmond, WA (US)

(72) Inventors: Ankan Saha, San Francisco, CA (US); Ajith Muralidharan, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 512 days.

(21) Appl. No.: 15/157,184

(22) Filed: May 17, 2016

(65) Prior Publication Data

US 2017/0337198 A1   Nov. 23, 2017

(51) Int. Cl.
| | | |
|---|---|---|
| *H04L 29/08* | (2006.01) | |
| *H04L 12/58* | (2006.01) | |
| *G06Q 30/02* | (2012.01) | |
| *G06Q 50/00* | (2012.01) | |
| *G06Q 10/10* | (2012.01) | |

(52) U.S. Cl.
CPC .......... *H04L 67/306* (2013.01); *G06Q 10/10* (2013.01); *G06Q 30/02* (2013.01); *G06Q 30/0202* (2013.01); *G06Q 50/01* (2013.01); *H04L 51/14* (2013.01); *H04L 51/32* (2013.01)

(58) Field of Classification Search
CPC ....... H04L 67/306; H04L 51/14; H04L 51/32; G06Q 10/10; G06Q 30/02; G06Q 30/0202; G06Q 50/01

USPC .......................................................... 707/733
See application file for complete search history.

(56) References Cited

U.S. PATENT DOCUMENTS

| | | | |
|---|---|---|---|
| 9,477,659 B2 | 10/2016 | Swerdlow et al. | |
| 2007/0112792 A1* | 5/2007 | Majumder | G06F 17/30867 |
| 2011/0225170 A1* | 9/2011 | Obasanjo | G06F 17/30864 |
| | | | 707/748 |
| 2013/0041653 A1 | 2/2013 | Tseng | |
| 2013/0268597 A1* | 10/2013 | van Hoff | H04L 67/306 |
| | | | 709/204 |
| 2014/0280214 A1* | 9/2014 | Han | G06F 16/90 |
| | | | 707/748 |
| 2014/0337436 A1* | 11/2014 | Hoagland | G06F 17/30867 |
| | | | 709/204 |
| 2016/0349938 A1* | 12/2016 | Sharon | G06Q 50/01 |
| 2017/0140436 A1* | 5/2017 | Zheng | G06Q 30/02 |
| 2017/0161264 A1 | 6/2017 | Zhao et al. | |

OTHER PUBLICATIONS

Savev, Stefan. "Cosine Similarity Part 1: The Basics". Published Mar. 29, 2015. Accessed Sep. 25, 2018 from <http://stefansavev.conn/blog/cosine-similarity/> (Year: 2015).*
"Non Final Office Action Issued in U.S. Appl. No. 15/157,114", dated May 14, 2018, 14 Pages.

* cited by examiner

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

The present disclosure describes various embodiments of methods, systems, and machine-readable mediums which help determine a user's likely affinity for an article presented (or to be presented) in a heterogeneous feed of a social network.

12 Claims, 4 Drawing Sheets

DETERMINING VIEWER AFFINITY FOR ARTICLES IN A HETEROGENEOUS CONTENT FEED

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information.

For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes may be referred to as "business networks" or "professional networks").

In some social networks, users may be provided with a heterogeneous feed of content, such as articles, job recommendations, news recommendations, suggestions to connect with other users in the network, news stories regarding entities (e.g., such as people or companies) that the user is following, and other content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the embodiments in the present disclosure are not limited to a social or business networking service.

Figure 1:
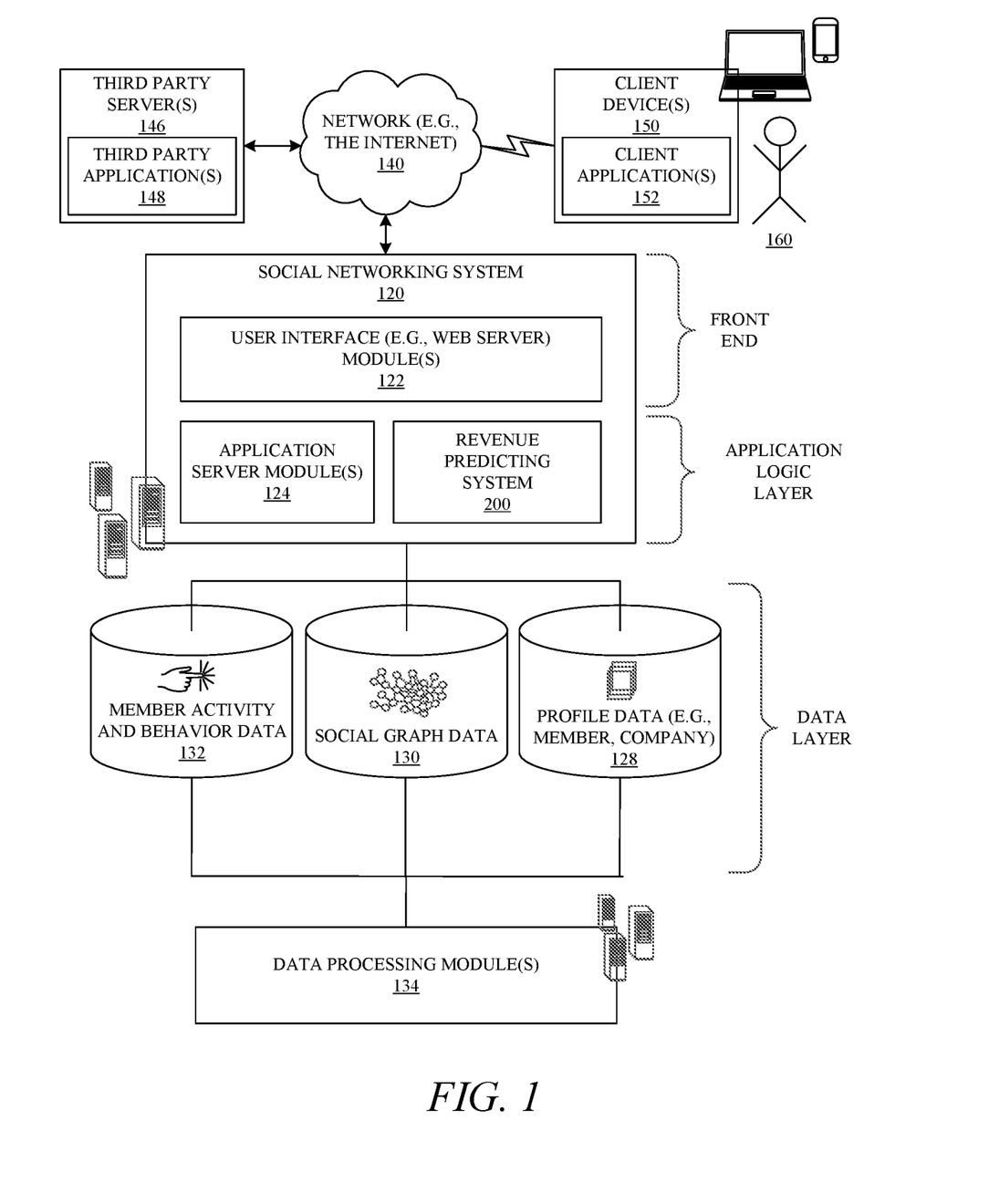
FIG. 1 is a block diagram illustrating a client-server system, according to various exemplary embodiments.

FIG. 1 illustrates an exemplary client-server system that may be used in conjunction with various embodiments of the present disclosure. The social networking system 120 may be based on a three-tiered architecture, including (for example) a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. Various additional functional modules and engines may be used with the social networking system illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the embodiments of the present disclosure are not limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems.

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some exemplary embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

In some embodiments, when a user initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some exemplary embodiments, members may receive advertising targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

Further, as shown in FIG. 1, a data processing module 134 may be used with a variety of applications, services, and features of the social networking system 120. The data processing module 134 may periodically access one or more of the databases 128, 130, and/or 132, process (e.g., execute batch process jobs to analyze or mine) profile data, social graph data, member activity and behavior data, and generate analysis results based on the analysis of the respective data. The data processing module 134 may operate offline. According to some exemplary embodiments, the data processing module 134 operates as part of the social networking system 120. Consistent with other exemplary embodiments, the data processing module 134 operates in a separate system external to the social networking system 120. In some exemplary embodiments, the data processing module 134 may include multiple servers of a large-scale distributed storage and processing framework, such as Hadoop servers, for processing large data sets. The data processing module 134 may process data in real time, according to a schedule, automatically, or on demand. In some embodiments, the data processing module 134 may perform (alone or in conjunction with other components or systems) the functionality of method 200 depicted in FIG. 2 and described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
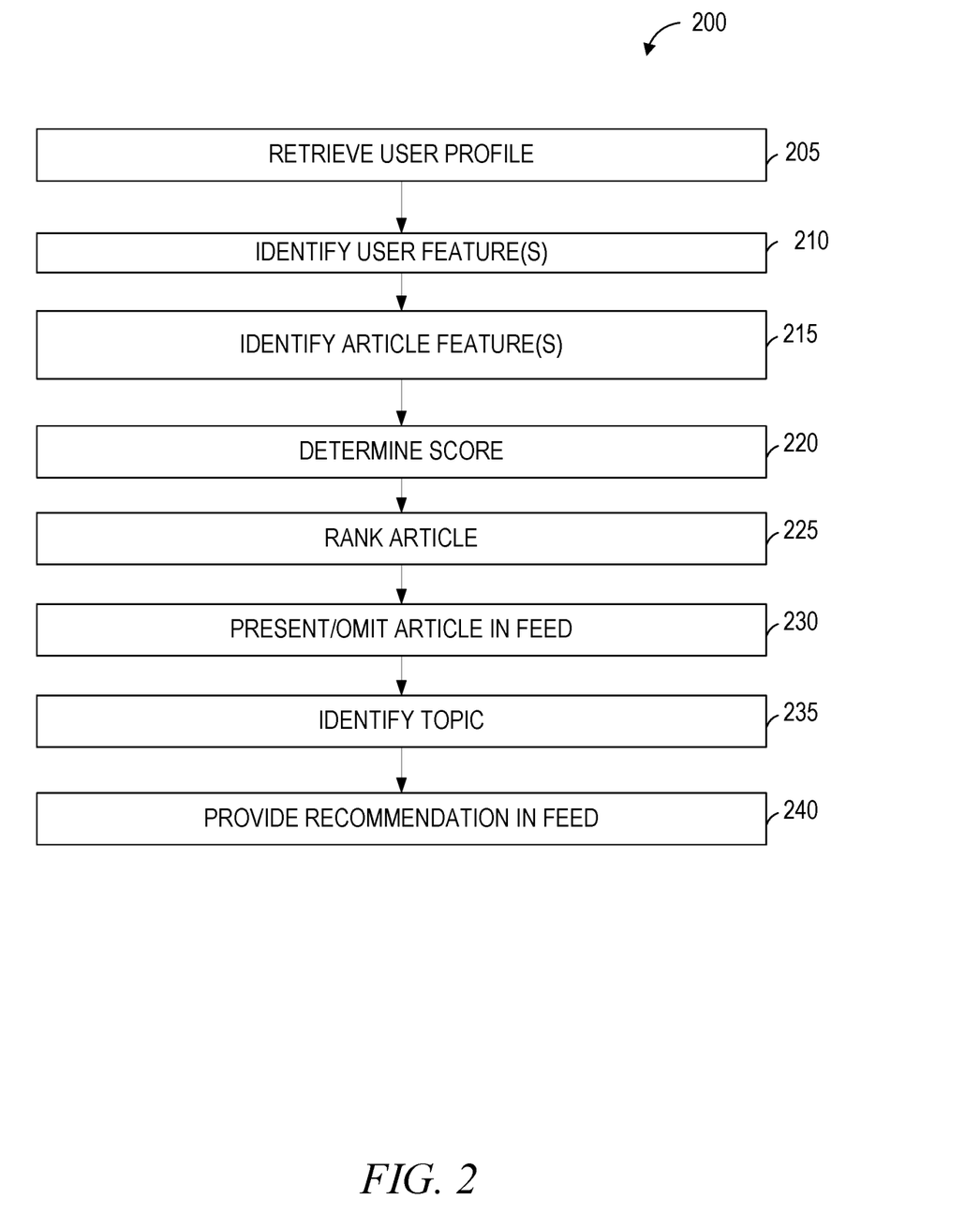
FIG. 2 is a flow diagram of an exemplary method according to various exemplary embodiments.

FIG. 2 illustrates an exemplary method 200 according to various aspects of the present disclosure. Embodiments of the present disclosure may practice the steps of method 200 in whole or in part, and in conjunction with any other desired systems and methods. The functionality of method 200 may be performed, for example using any combination of the systems depicted in FIGS. 1, 3, and/or 4.

In this example, method 200 includes retrieving a social network profile of a user (205), identifying one or more user features from the user profile (210), identifying one or more features article features from an article (215), determining a score based on the one or more user features and article features (220), ranking the article based on the score (225), presenting or omitting the article to the user in a heterogeneous feed in the social network based on the score (230), identifying one or more topics of interest to the user based on the score (235), and providing a recommendation for the article (or other articles) to the user in the heterogeneous feed based on the score (240).

A social networking service is a type of networked service provided by one or more computer systems accessible over a network that allows members of the service to build or reflect social networks or social relations among members. Members may be individuals or organizations. Typically, members construct profiles, which may include personal information such as the member's name, contact information, employment information, photographs, personal messages, status information, multimedia, links to web-related content, blogs, and so on. In order to build or reflect the social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of, business networking purposes; and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

As part of their member profiles, members may include information on their current position of employment. Information on their current position includes their title, company, geographic location, industry, and periods of employment. The social networking service may also track skills that members possess and when they learned those skills. Skills may be automatically determined by the social networking service based upon member profile attributes of the member, or may be manually entered by the member.

Referring again to method 200 in FIG. 2, embodiments of the present disclosure may retrieve (205) a user profile and identify one or more features associated with the user (210) based on the profile. Any number and type of user feature may be retrieved (205) and identified (210) by embodiments of the present disclosure, such as a job title of the user, an organization associated with the user, an industry associated with the user, a skill associated with the user, a geographical region associated with the user, as well as any of the other features associated with a user of a social network described herein.

In a heterogeneous feed on a social network, various items may be presented to a user, such as articles containing different media formats (e.g., text, images, video, etc.), job postings, news stories, recommendations (e.g., to view content such as articles, suggestions to connect with other members of the social network, etc.) and updates (e.g., on the status of a user's friends in the social network). Embodiments of the present disclosure may identify one or more features of an article (215) before or after the article is posted on a user's heterogeneous stream. Any number and type of article features may be identified (215), including a keyword, a length of the article, a language the article is written in, a topic in the article, a skill associated with the article, an age of the article, user activity associated with the article, and other features.

Embodiments of the present disclosure can help identify content (such as articles) of likely interest to a user in order to increase the quality and usefulness of the content provided to the user in the user's heterogeneous feed. In the example shown in FIG. 2, a score is determined (220) based on one or more features associated with the user and one or more features associated with an article, where the score reflects a level of expected affinity of the user for the article.

In some embodiments, a scalar score may be determined (220) based on vectors for one or more user features and one or more article features. In such cases, a relatively high scalar score can represent a relatively greater likelihood of user affinity to the article, while a relatively low scalar score can represent a relatively lower likelihood of user affinity to the article. In such cases, the scalar score may be determined based on the cross-product of a respective vector representing each respective user feature with a respective vector representing each respective article feature. For example, in a case where there are five user features being compared with five article features, a total of twenty-five individual scalar sub-scores can be determined, and the final scalar score determined based on the individual sub-scores.

Determination of the score representing the affinity of a user to an article may be based on a subset of the individual sub-scores calculated based on different combinations of article and user features. In some embodiments, for example, a level of effectiveness in reflecting the level of affinity may be determined for each sub-score and a subset of the sub-scores selected to generate the final score based on the sub-scores having a relatively high effectiveness in identifying affinity, while leaving out sub-scores having relatively low effectiveness in identifying affinity. In this manner, embodiments of the present disclosure can tune the model for identifying a user's affinity for articles and topics over time. In one example, determining the scalar score reflecting the user's level of affinity for an article is based on weighted score generated from a vector representing the feature associated with the user and a vector representing the feature associated with the article. The score may be weighted based on the user feature(s) and article feature(s) in any desired manner, including based on how effective a respective feature in reflecting the user's level of affinity for the article.

Scores may be determined at any desired periodic frequency, and not all scores need be determined with the same frequency. In some cases, for example, article features such as the article's length and keywords within the article may be relatively static. In other cases, article features such as the article's age, activity data (e.g., the number of views, recommendations for the article by other users, comments on the article, etc.) may change relatively quickly. However, constantly updating scores based on multiple features for many articles across many users can be prohibitively expensive computationally and it can be difficult to access all the latest data for every feature.

Accordingly, some embodiments may be adapted to calculate the scores for some features in an online fashion (i.e., updating relatively frequently, such as in real-time or near-real-time as the feature changes) while other scores can be calculated in an offline fashion (i.e., calculated relatively infrequently and/or stored in a database for periodic retrieval).

In one exemplary embodiment, a first subset of features and a second subset of features (either article features, user features, or a combination thereof) are identified, where the first subset of features are updated by the social network relatively less often than the second subset of features. Examples of features in the first subset may include, for example, a language the article is written in, the length of the article, and a topic in the article. Examples of features in the second subset, by contrast, may include the article's age and the number of user views of the article. A first set of sub-scores is calculated based on the first subset of features, at a first periodic frequency, while a second set of sub-scores is calculated based on the second subset of features, with the second periodic frequency being greater (i.e., more often) than the first periodic frequency. The final scalar score is determined based on the first set of sub-scores and the second set of sub-scores at the higher (second) frequency but without having to recalculate the first set of sub-scores at the higher frequency.

In another example, consider the case of scoring in a context of user with feature vector $u_i \in \mathbb{R}_m$ interacting with update with feature vector $z_j \in \mathbb{R}_n$. For a specific example, we assume that is an article. Learning a complete outer product model would result in a matrix $B \in \mathbb{R}_{m \times n}$ so that the final score is given by u' Bz.

Now assume that among the n article features, $z_{j1} \in \mathbb{R}_m$ are available online while $z_{j_2} \in \mathbb{R}^{n_2}$ are available offline. (Thus $n_1+n_2=n$). In this case we can break down the generation of the score as:

$$u_i'[B_1 B_2]\begin{pmatrix} z_{j1} \\ z_{j2} \end{pmatrix} = u_i' B_1 z_{j1} + \underbrace{u_i' B_2 z_{j2}}_{S_2}$$

Since the second part of the score is completely offline, it can potentially be calculated on a periodic basis and be pushed into the distributed data store. This leaves the evaluation of the online part.

Note that we can compute $u'_i = x_i$ in advance, so that when we get access to the article features $z_{j1}$ online, the score can be evaluated by taking the dot product $x_i z_{j1} = S_1$. The score for the viewer article pair can be evaluated by taking the sum of $S_1$ and $S_2$.

For a user i, a score can be generated for the each of the features $u'_i B_1 = x_i$ and pushed into the distributed data store. The distributed data store can be keyed by a user identifier and under a particular query data key (e.g. "articleLanguage-Features"). In one exemplary embodiment, the key includes the name of the feature and the value is the corresponding coordinate of $x_i$. The offline and online scores may be handled in different ways. The scores $S_1$ and $S_2$ are added to generate score S.

In some embodiments, a model utilizing the determined scores is trained and uses for scoring any particular day's data by extracting the articles active on that particular day. Scores are generated based on features corresponding to the articles and users and used to help train the model. The scores may be stored (e.g., in a distributed data store) on a periodic (e.g., daily) basis. In this example, the score corresponds to the dot product between the features and the coefficients of the model. Depending on the platform (desktop and mobile), different models can be trained.

While generating scores, the features corresponding to the candidate articles may be scored by different models (e.g., corresponding to desktop and mobile) and push the different scores into the data store with different key values for queries.

The affinity score can be used for a variety of purposes within the social network, such as for ranking the article (225) as well as for ranking other types of updates to the feed. For example, the order of articles presented to a user via the feed may be based on the respective ranking of each article, with higher-ranked articles being presented ahead of lower-ranked articles. Embodiments may determine whether to present or omit the article within the feed for a user (230) in response to, for example, the score meeting or exceeding a predetermined threshold. The score can also be used in identifying a topic of interest to the user within the article (235). The score can further be used to provide a recommendation (240) to the user for the article. The score may also be used to provide recommendations for other articles via the user's heterogeneous feed that contain the same feature(s) used in determining the score.

Among other things, embodiments of the present disclosure help provide personalized recommendations for articles and other content. Instead of using matrix factorization algorithms of some conventional systems, the embodiments of the present disclosure utilize user features and article features to generate a score which captures a notion of affinity between the user and a particular article. This score can then be used to rank articles in some order to provide article-recommendations to users and/or for ranking articles in a heterogeneous news-feed.

Embodiments of the present disclosure help identify key aspects of the user's interests (in the form of skills/industry/interests), information about the article (topics/skill mentions) as well as social actions on the articles (in terms of clicks/viral actions taken by the first degree connections of the user as well as by all users globally) so that the viewer-article affinity score becomes a key indicator to whether the user will click on the article or perform a social action (like/share/comment) on it.

Embodiments of the present disclosure can use historical data of users interacting with articles on different platforms to learn an affinity score between a user and article. For example, embodiments may train a click prediction model on articles which includes features extracted from the user's profile, text and metadata information of the article. Various "interaction" features can be identified by combining such features as well as features capturing clicks/social actions on the articles globally as well as by first degree connection of the user. Scoring this trained model with the features obtained from a new (user, article) pair can then provide the viewer-article affinity score for the article.

This affinity score can be used as a feature for an article and can be combined with other features to learn a click prediction model for items on the feed which can be then used for news-feed ranking (ranking the articles along with other kinds of updates).

Figure 3:
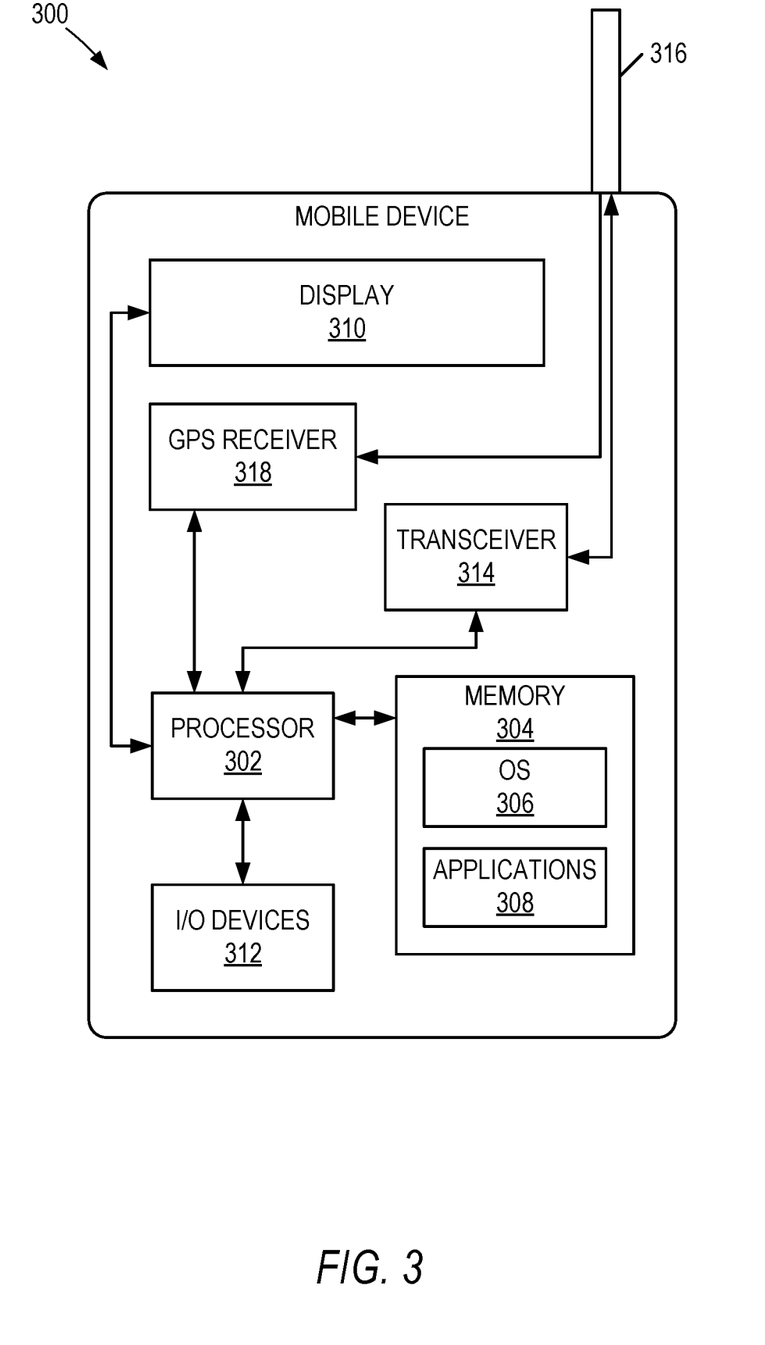
FIG. 3 is a block diagram illustrating an exemplary mobile device.

FIG. 3 is a block diagram illustrating a mobile device 300, according to an exemplary embodiment. The mobile device 300 may include a processor 302. The processor 302 may be any of a variety of different types of commercially available processors 302 suitable for mobile devices 300 (for example, an XScale architecture microprocessor, a microprocessor without interlocked pipeline stages (MIPS) architecture processor, or another type of processor 302). A memory 304, such as a random access memory (RAM), a flash memory, or other type of memory, is typically accessible to the processor 302. The memory 304 may be adapted to store an operating system (OS) 306, as well as application programs 308, such as a mobile location enabled application that may provide LBSs to a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 may be coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a GPS receiver 318 may also make use of the antenna 316 to receive GPS signals.

Certain embodiments may be described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In exemplary embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some exemplary embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Exemplary embodiments may be implemented in digital electronic circuitry, or in computer hardware, firmware, software, or in combinations of them. Exemplary embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In exemplary embodiments, operations may be performed by one or more programmable processors executing a computer program to perform functions by operating on input data and generating output. Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 4:
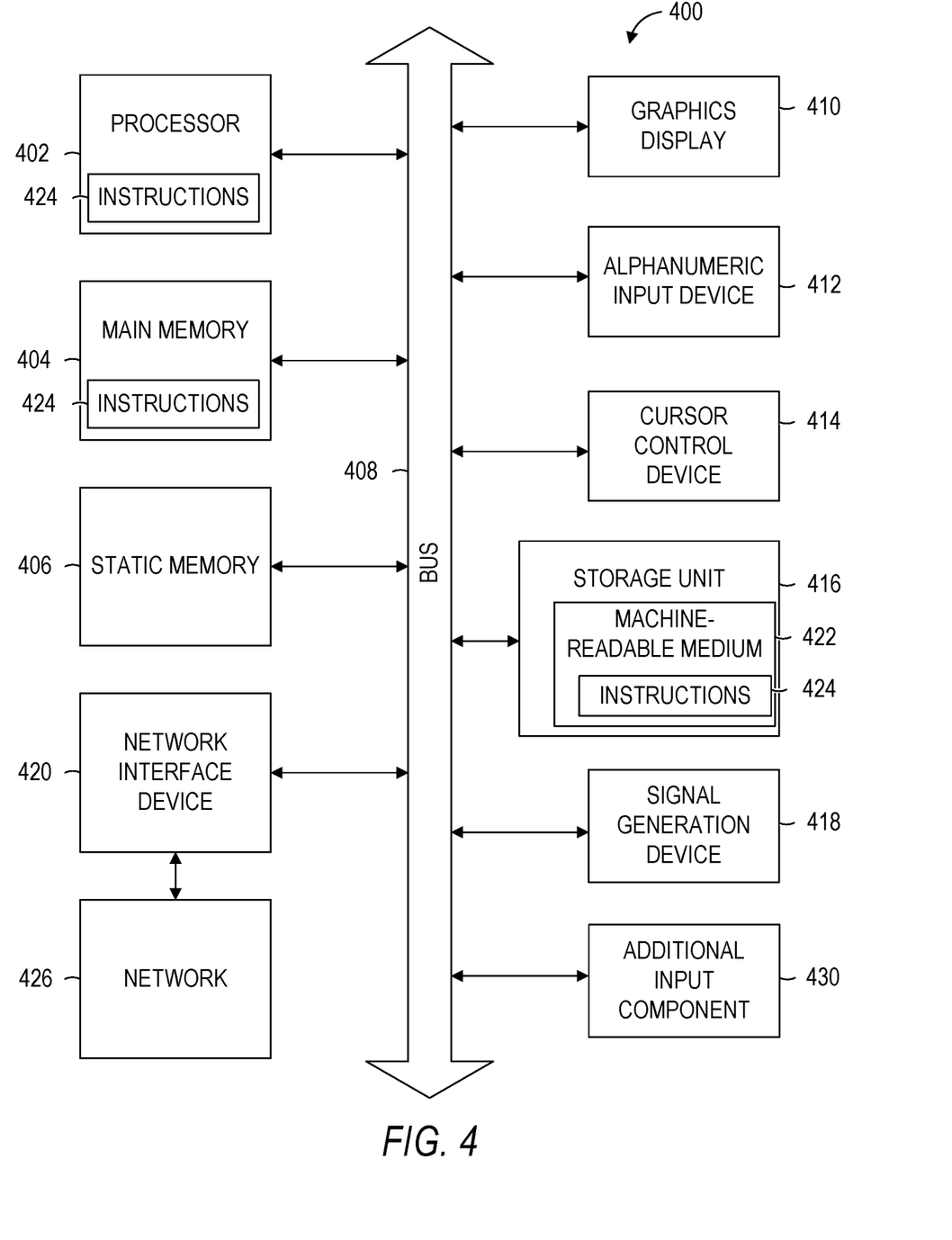
FIG. 4 is a block diagram illustrating components of an exemplary computer system.

FIG. 4 is a block diagram illustrating components of a machine 400, according to some exemplary embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system within which the instructions 424 (e.g., software, a program, an application, an applet, or other executable code) for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 426 via the network interface device 420. For example, the network interface device 420 may communicate the instructions 424 using any one or more transfer protocols (e.g., hypertext transfer protocol (HTTP)).

In some exemplary embodiments, the machine 400 may be a portable computing device, such as a smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an exemplary embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A method comprising:
retrieving, by a computer system from a database in communication with the computer system, a member profile of a member of a social networking service, the member profile including information about the member, said information provided by the member;
identifying, by the computer system, a plurality of features associated with the member based on the member profile;
identifying, by the computer system, a plurality of features associated with an article eligible for sharing in a feed of the social networking service;
determining, by the computer system, based on the plurality of features associated with the member and the plurality of features associated with the article, a scalar score reflecting a level of affinity of the member for the article; and
for each article in a plurality of articles for which a scalar score has been derived:
using the scalar score, in combination with other features, as input to a click-prediction model to derive a ranking score with the click-prediction model, the click-prediction model for ranking content to be presented via a heterogenous feed of the social networking service; and
presenting, by the computer system, the article to the member within the heterogeneous feed of the social networking service in response to the ranking score exceeding a predetermined value, wherein the order of presentation of articles in the heterogeneous feed is determined based on the respective ranking score of each article in the plurality of articles.

2. The method of claim 1, wherein determining the scalar score reflecting the member's level of affinity for the article is based on a weighted score generated from a vector representing the plurality of features associated with the member and a vector representing the plurality of features associated with the article.

3. The method of claim 1, wherein determining the scalar score includes determining a plurality of scalar sub-scores for each combination of the plurality of features associated with the member and the plurality of features associated with the article, and wherein the scalar score is based on the plurality of scalar sub-scores.

4. The method of claim 3, wherein determining the scalar score includes:
   identifying a level of effectiveness for each of the plurality of scalar sub-scores in reflecting the level of affinity of the member for the article;
   selecting a subset of the plurality of scalar sub-scores based on the respective level of effectiveness in reflecting the level of affinity of the member for the article for each respective scalar sub-score; and
   determining the scalar score based on the subset of the plurality of scalar sub-scores.

5. The method of claim 3, wherein determining the scalar score includes:
   identifying a first subset of the plurality of features associated with the article and a second subset of the plurality of features associated with the article, wherein the first subset of features are updated by the social networking service relatively less often than the second subset of features;
   determining a first plurality of scalar sub-scores based on the first subset of features at a first periodic frequency and a second plurality of scalar sub-scores based on the second subset of features at a second periodic frequency, wherein the second periodic frequency is greater than the first periodic frequency; and
   determining the scalar score at the second periodic frequency based on the first subset of features and the second subset of features.

6. The method of claim 1, wherein the plurality of features associated with the article includes one or more of: a keyword, a length of the article, a language the article is written in, a topic in the article, a skill associated with the article, an age of the article, and member activity associated with the article.

7. The method of claim 1, wherein the plurality of features associated with the member includes one or more of: a job title of the member, an organization associated with the member, an industry associated with the member, a skill associated with the member, and a geographical region associated with the member.

8. A system comprising:
   a processor; and
   memory coupled to the processor and storing instructions that, when executed by the processor, cause the system to:
   retrieve, from a database in communication with the system, a member profile of a member of a social networking service, the member profile including information about the member, said information provided by the member;
   identify a plurality of features associated with the member based on the member profile;
   identify a plurality of features associated with an article;
   determine, based on the plurality of features associated with the member and the plurality of features associated with the article, a scalar score reflecting a level of affinity of the member for the article; and
   for each article in a plurality of articles for which a scalar score has been derived:
   use the scalar score, in combination with other features, as input to a click-prediction model to derive a ranking score with the click-prediction model, the click-prediction model for ranking content to be presented via a heterogenous feed of the social networking service; and
   present the article to the member within a heterogeneous feed of the social networking service in response to the ranking score for the article exceeding a predetermined value, wherein the order of presentation of the plurality of articles in the heterogeneous feed is determined based on the respective ranking score of each article in the plurality of articles.

9. The system of claim 8, wherein determining the scalar score reflecting the members's level of affinity for the article is based on a weighted score generated from a vector representing the plurality of features associated with the and a vector representing the plurality of features associated with the article.

10. The system of claim 8, wherein determining the scalar score includes determining a plurality of scalar sub-scores for each combination of the plurality of features associated with the member and the plurality of features associated with the article, and wherein the scalar score is based on the plurality of scalar sub-scores.

11. The system of claim 10, wherein determining the scalar score includes:
   identifying a level of effectiveness for each of the plurality of scalar sub-scores in reflecting the level of affinity of the member for the article;
   selecting a subset of the plurality of scalar sub-scores based on the respective level of effectiveness in reflecting the level of affinity of the member for the article for each respective scalar sub-score; and
   determining the scalar score based on the subset of the plurality of scalar sub-scores.

12. The system of claim 10, wherein determining the scalar score includes:
   identifying a first subset of the plurality of features associated with the article and a second subset of the plurality of features associated with the article, wherein the first subset of features are updated by the social networking service relatively less often than the second subset of features;
   determining a first plurality of scalar sub-scores based on the first subset of features at a first periodic frequency and a second plurality of scalar sub-scores based on the second subset of features at a second periodic frequency, wherein the second periodic frequency is greater than the first periodic frequency; and
   determining the scalar score at the second periodic frequency based on the first subset of features and the second subset of features.

* * * * *